July 1, 1952     R. E. OBERLIN, SR     2,601,881

STEERING WHEEL COVER

Filed Dec. 30, 1948

INVENTOR,
RALPH E. OBERLIN SR.
BY
attorney.

Patented July 1, 1952

2,601,881

UNITED STATES PATENT OFFICE 2,601,881

STEERING WHEEL COVER

Ralph E. Oberlin, Sr., Massillon, Ohio, assignor to Igelstroem-Oberlin, Inc., Massillon, Ohio, a corporation of Ohio Application December 30, 1948, Serial No. 68,172

2 Claims. (Cl. 150—52)

This invention relates to a protective cover for temporary application to such parts as control wheels and for example, especially to the steering wheels of automobiles while the latter are being serviced to prevent the soiling of such wheels with oil or grease.

It is a prime object to provide a novel means which will impress an automobile owner with the fact that his car is being serviced with maximum care and efficiency and it will be returned with the steering-wheel clean, thus being an inducement for the owner to continue to patronize the same service station.

Further I aim to provide such a means as will afford an excellent advertising medium.

Additionally, objects are to provide such a means in the form of a cover which is exceedingly simple and capable of manufacture expeditiously and at minimum cost.

Again, a desire is to carry out the invention as a sheet having novel elastic means to readily conform and attach the sheet to a steering wheel.

Various additional objects and advantages will become apparent from a consideration of the description following taken in connection with accompanying drawings illustrating one form of the invention by way of example.

Figure 1:
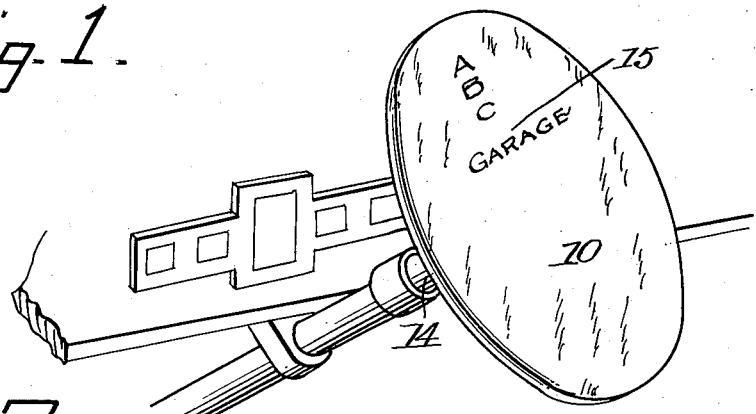
Fig. 1 is a fragmentary view in perspective looking toward the instrument board of an automobile and showing the improved cover in place on a steering wheel.

Referring specifically to the drawings wherein like reference characters designate like or corresponding parts throughout the different views, 10 designates a sheet of suitable flexible or foldable material, such as cloth, paper, non-woven cotton, plastic or the like in one or more pieces and of any one or more of such materials. Said sheet 10 is not necessarily rectangular, but is preferably so because no waste results in cutting same, and it will assume the desired form for retention as a cover on an automobile steering wheel. Obviously sheet 10 may be made in any desired shape and size or series of sizes.

Figure 2:
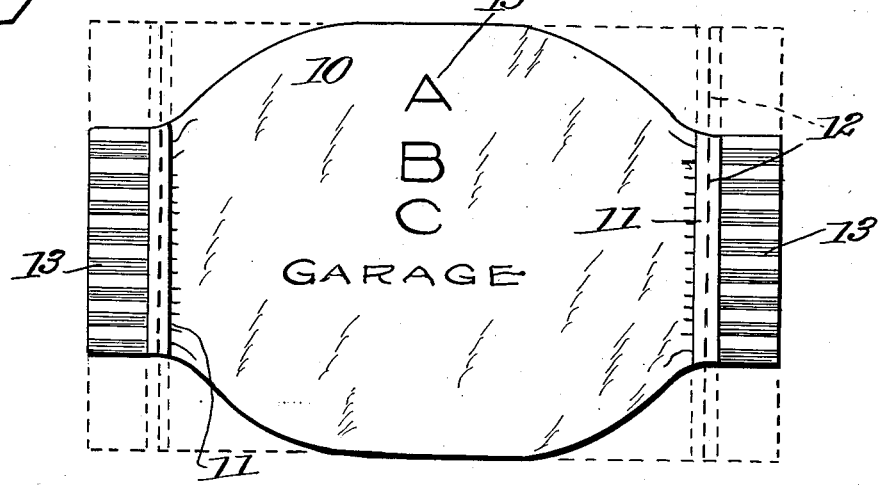
Fig. 2 is a plan view of the cover.
Figure 3:
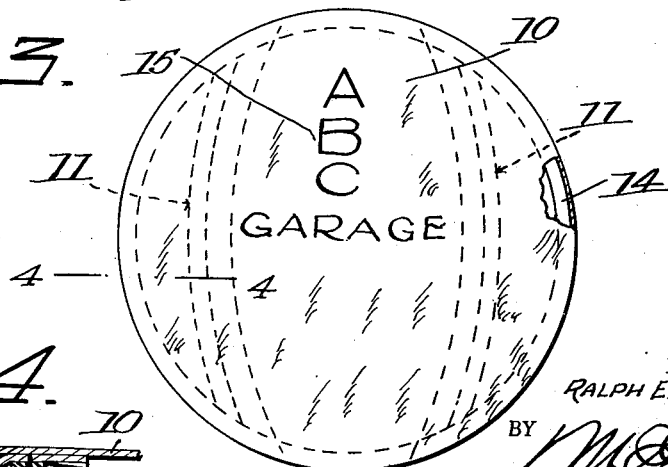
Fig. 3 is a plan view showing the cover applied to a steering wheel.
Figure 4:
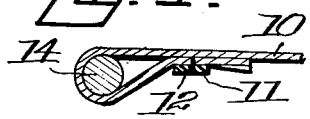
Fig. 4 is a detail section taken on the line 4—4 of Fig. 3.

Along opposite parallel edged portions of the sheet 10, elastic strips 11 are stitched as with textile thread 12, for example. Said strips 11 may be of a form containing elastic rubber strands covered with textile fabric, although no limitation is to be implied. Attention is called to the fact that said stitching of the strips 11 to the sheet 10 is effected while the sheet is flat or ungathered at the ends but while the strips are in a stretched condition as suggested by the dotted lines in Fig. 2. Hence, after the strips are thus secured and released, the strips 11 will return to normal condition or length and gather the adjacent edge portions as at 13, as shown in full lines in Fig. 2.

In addition to impressing the autoist with the efficiency and care to be expected from the garage or service station, the sheet is an excellent advertising or information-imparting medium as any desired matter to this end may be delineated on either or both faces of the sheet 10 as at 15.

In using the device, it is placed with either face uppermost over an automobile steering wheel 14 and the gathered end portions 13 and strips 11 are turned down and then inwardly toward each other under the steering wheel 14 aided by the contraction of strips 11 which necessarily are stretched through engagement with steering-wheel 14 in applying the sheet or cover 10. Such cover is effectively held in place stretched across the top and conforming to the shape of the steering wheel solely by the contraction of the gathered portions 13 thereof in combination with the elastic strips 11, the cover being readily applied or removed. As either face of the cover 10 may be uppermost, the cover is reversible as to position.

It will be noted that the device is an inexpensive article. Hence it may be made for use once and then discarded or made for use a number of times and even for repeated use when made of a washable material or one which may be otherwise inexpensively cleaned.

Various changes may be resorted to provided they fall within the spirit and scope of my invention.

I claim:

1. A cover of the class described comprising a flexible sheet adapted to be placed flatwise and axially over a round steering-wheel, said sheet being of greater length than width to provide end portions foldable downwardly and inwardly under such steering-wheel, said end portions having separate contractile and expansible elements thereon normally gathering the associated end portions of the sheet, whereby the sheet before application to the steering wheel centrally remains of normal width and said end portions are of less width, causing attachment of the sheet through said folding and the expanding and contracting action of said elements to be attached to said steering wheel.

2. A steering wheel cover comprising a rectangular sheet, separate expansible means secured thereto transversely, one adjacent each end, said means being of less width than the width of said sheet and gathering the said end portions, said sheet being of a length enabling folding of said end portions along lines between said means downwardly and inwardly toward each other in attaching the cover to a steering wheel.

RALPH E. OBERLIN, Sr.

REFERENCES CITED

The following references are of record in the file of this patent:

UNITED STATES PATENTS

| Number | Name | Date |
| --- | --- | --- |
| 1,755,133 | Rowe | Apr. 15, 1930 |
| 1,927,913 | Bennett | Sept. 26, 1933 |
| 1,987,599 | Bennett | Jan. 15, 1935 |
| 1,997,738 | Maxedon et al. | Apr. 16, 1935 |